Dec. 21, 1965   M. R. PENLAND   3,224,124
PROGRAM INDICATOR
Filed June 5, 1963
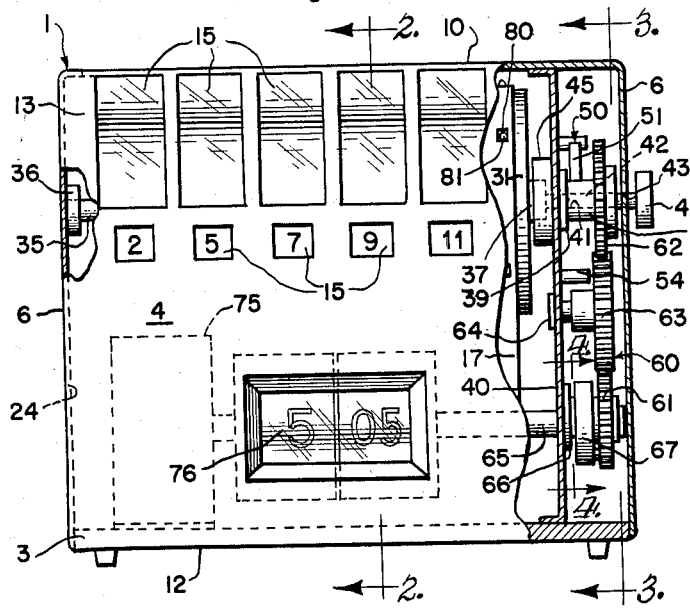
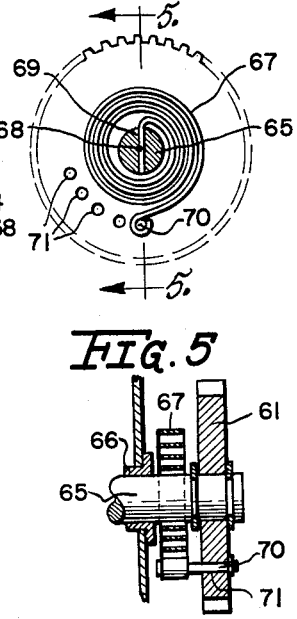
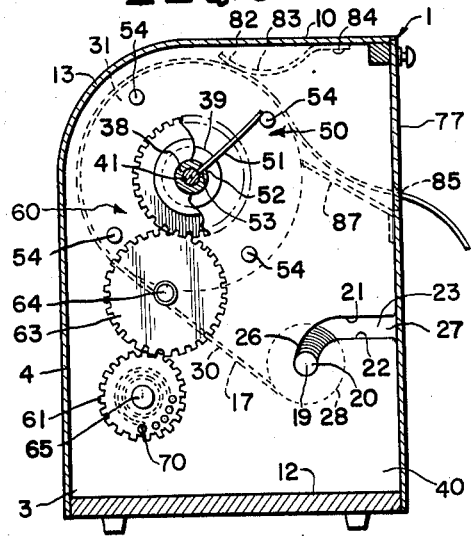
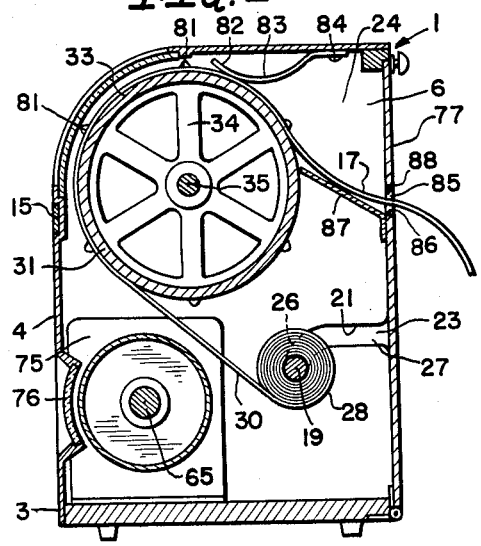
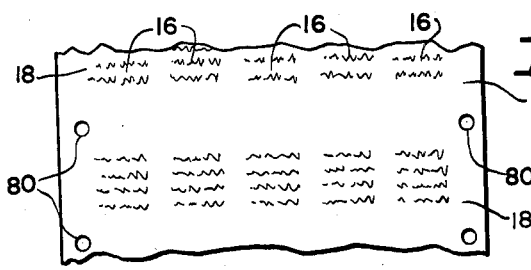
INVENTOR.
Mark R. Penland
BY
John J. Kowalski
Atty.

United States Patent Office 3,224,124
Patented Dec. 21, 1965

3,224,124
PROGRAM INDICATOR
Mark R. Penland, 5123 W. Montrose Ave., Chicago, Ill.
Filed June 5, 1963, Ser. No. 285,678
4 Claims. (Cl. 40—30)

This invention pertains to a mechanism for indicating forthcoming and instant programs which are being offered by various transmission media such as television or radio.

One of the most disconcerting and frustrating aspects of watching television or listening to a radio broadcast is in the mechanics of finding a program, checking the time and then hunting through the program to find the listing for the time and station.

It is a general object of this invention to provide a novel program indicator which utilizes a spool of printed tape having a plurality of station listings arranged preferably in columns with periodic box listings, for example, every half hour, of the program being offered at the corresponding time, said indicator having windows corresponding to the columns in registry therewith for viewing the appropriate listing.

The invention contemplates the provision of a novel indicator having a housing with a drum therein upon which there is trained a tape of program listings, the tape being advanced past a viewing window pursuant to rotation of the drum.

A more specific object of the invention is to provide a novel program indicator which comprises a drum within a housing in registry with plural window means therein, the drum advancing an imprinted tape behind the window means at a predetermined time rate to expose in each of the window means a program listing for the respective time interval.

Another object of the invention is to provide a novel program indicator in which there is provided a simple and efficient escapement mechanism for driving the tape advancing drum in timed increments.

The invention contemplates a novel tape advancing mechanism for a program indicator which comprises a tape advancing drum yieldably restrained against rotation until the torque applied thereto transcends a predetermined value, the torque being incrementally increased throughout a predetermined time period and regulated by a novel timing device.

A further object of the invention is to provide a drive for a tape advancing drum of a program indicator, said drive comprising a drive shaft driven at a predetermined rate and connected to a torsion spring means which is connected to output means and operable to load the spring means to a predetermined torque level, the output means being connected to the drum shaft which is resiliently biased in opposition to the torque being applied by the output means at a predetermined level such that the spring means only transcends the level at predetermined time intervals whereupon the drum shaft escapes the bias and the drum is incrementally advanced and the spring means is caused to unwind preparatory to winding up for the next cycle.

A further object of the invention is to provide a novel tape mounting assembly in the program indicator whereby the tape as it is being discharged from the device exits in the tape as it is being discharged from the device exits through a slot in the housing, the slot having a sharp edge against which the discarded tape may be torn off.

These and other objects and advantages inherent in and encompassed by the invention will become more readily apparent from the specifications and the drawings, wherein:

FIGURE 1 is a front view partly broken away and in section of the novel program indicating device;

FIGURE 2 is a sectional view taken substantially on line 2—2 of FIGURE 1;

FIGURE 3 is a further sectional view taken substantially on line 3—3 of FIGURE 1;

FIGURE 4 is an enlarged sectional view taken substantially on line 4—4 of FIGURE 1;

FIGURE 5 is a sectional view taken substantially on line 5—5 of FIGURE 4; and

FIGURE 6 is a fragmentary front view of the tape.

Describing the invention in detail and having particular reference to the drawings, there is shown my novel program indicator generally designated 1 having a support structure including a casing or housing 3 having an upright front wall 4, side walls 6, 6, a top wall 10, and a bottom wall 12.

These walls are preferably integrally united and may be of any material such as metal or plastic. The front and top walls are interconnected by an arcuate corner radius wall 13 in which there are apertured a plurality of window openings 15 each of which is suitably identified with an appropriate channel or station designation such as 2, 5, 7, 9 and 11.

These windows 15 are laterally spaced a distance of the order to register with the columns 16 of imprinting on the program tape 17. The columns 16 on the tape are in turn broken down to half-hour boxes 18 which are dimensioned to align with the respective windows for viewing by the user.

The tape 17 is a flat ribbon of paper which may be mounted on a shaft 19, the shaft 19 having end portions 20 snugly received within the margins 21, 22 of the mounting slots 23 which are suitably formed on the interior sides 24 of the side walls 6 and intermediate wall 40 of the housing, said slots 23 having forward downwardly directed end portions 26 which lead into rearwardly directed generally horizontal portions which have ingress and egress open ends 27 at the rear of the housing.

The shaft 19 of the spool or cylinder portion 28 of the tape 17 is preferably formed of wood or a deformable plastic such as nylon or polyethylene so that it may be inserted into the slots 23 tightly to prevent the spool from rolling freely but maintaining the tape length 30 taut between the spool 28 and the advancing drum or reel 31 under which the tape 17 is inserted and about which the tape is wrapped.

The drum is a cylindrical element and comprises an outer shell 33 which is connected by spokes 34 to the center shaft 35.

The shaft 35 is journalled at one end in a bearing 36 formed or provided on one side wall 6 and at its other end 37 is journalled in one end of a stub sleeve shaft 38 which in turn rotates in a bearing 39 suitably supported by an intermediate upright wall 40 which joins at its upper and lower ends with the top and bottom walls 10 and 12 of the enclosure 3.

The end 37 of shaft 35 is connected to an extension 41 which projects through the base 42 in the sleeve shaft 38 and through a coaxial opening 43 in the adjacent side wall 6. Extension shaft 41 has an outer end with a knob 44 thereon outside of the housing. Since the extension shaft and shaft 35 are interconnected turning of the knob will rotate the drum 31.

The sleeve shaft 38 is connected to the shaft 35 by an overrunning clutch 45, for example the sprag or ball and ramp type or any other convenient type. The clutch 45 drives the shaft 35 from shaft 38 only in the clockwise direction as shown in FIGURE 2 of the drawings to advance the tape.

The sleeve shaft 38 is associated with the escapement mechanism generally indicated 50 which comprises a resilient leaf spring element 51 having its inner end 52 anchored in a slot 53 in the sleeve shaft 38. The spring 51 extends radially from the shaft 38 and has its free end overlapping one of four stops or pins 54 which are arranged in an annular array on the wall 40 and connected at one end thereto. It will be noted that upon application of sufficient torque to the sleeve shaft 38 the spring will deflect sufficiently to escape over the pin it is abutting and advance to and engage the next succeeding pin in its path.

The sleeve shaft 38 is driven by a transmission generally designated 60 which comprises a driving gear 61, a driven gear 62 and an intervening gear 63. The driven gear is on the sleeve shaft 38 suitably secured thereto, the intermediate gear 63 is mounted on a stub shaft 64 supported from wall 40 and meshes with gears 61, 62 to provide an appropriate gear ratio reduction.

The driving gear 61 is rotatable on an output shaft 65 which is journalled on bearing 66 carried on wall 40.

A resilient torque connection is afforded gear 61 with shaft 65 in the form of a spiral spring 67 which has its inner end 68 connected with shaft 65 through a slot 69 in shaft 65 and the outer end is connected to a pin 70 which is selectively connected with gear 61 through any of the apertures 71 in gear 61, the apertures 71 serving to adjust the position of the terminal end of the spring 67 to provide balanced torsional loadings on the spring 67 and spring 51 and 67 such that upon the shaft 65 turning a predetermined number of turns the spring 67 will be wound sufficiently to flex the spring 51 so that the gears in turning will revolve the drum a quarter turn.

The shaft 65 is connected to a suitable synchronous motor 75 or any other suitable power source through any conventional gearing. The shaft 65 also drives the clock mechanism 76 which may be mounted in the front wall of the casing.

Thus the operator may conveniently insert a properly printed tape 17 into the casing through the rear access door 77 hinged to the bottom wall 12. After shaft 19 is inserted into slots 23 and forced into the forward end portions 26 thereof the tape is drawn under the drum 31 and the perforations 80 in the margins of the tape are fitted over the pins 81 in the periphery of the shell 33 along the lateral margins thereof. The tape, of course, will have a lead end of sufficient length to permit its wrap over the top of the drum and under the free end 82 of a hold-down spring 83 which has its other end anchored as at 84 to the underside of the housing.

The free end of the tape is passed through a slot 85 in the cover panel 77 which is provided from the lower edge 86 of slot 85 with a flexible guide finger 87 which has its free end directed against the drum to peel the paper tape off the drum.

The upper margin 88 of the slot 85 provides a sharp edge against which the expired portions of the tape are torn off.

Thus it will be observed, the timing mechanism drives the shaft 65 which winds the spring 67 until enough torque is developed to flex the spring 51 whereupon the spring 51 escapes over the pin 54 against which it abuts so that the gears 61, 63 and 62 are caused to rotate. Gear 62 drives the sleeve shaft 38 which, through the overrunning clutch 45 drives the shaft 35 and thus drum 31 which advances the tape to expose the next row of boxes corresponding to the time shown on the clock. It will be understood that the handle or knob 44 may be rotated to override the aforementioned drive to index the appropriate boxes with the windows corresponding to the time showing.

Having described one embodiment of the invention it will become readily apparent that various other forms of the invention will become available to those skilled in the art within the scope of the appended claims.

I claim:

1. In a television program indicating device, a housing, a metering drum rotatably mounted therein, said housing having a wall with a plurality of station identified windows therein, a tape wrapped on the drum and having program information thereon registerable with respective windows, and a timed driving mechanism driving said drum for drawing the tape across the windows whereby programs being shown at the instant time at the respective stations is revealed at respective windows, said driving mechanism comprising a leaf spring connected to the drum and extending radially therefrom and a plurality of spaced sequentially arranged abutments on the housing engageable with the spring, said spring adapted to deflect and escape over the abutments, said leaf spring reboundingly engaging the abutment subsequent to the abutment over which the leaf spring momentarily escapes.

2. In a device according to claim 1, wherein means is provided for moving the drum independently of the driving mechanism to synchronize the information on the tape with the actual time and said driving mechanism comprising an input shaft, a torsion spring wound about and connected to the shaft, gear means connected to the torsion spring and having a driving connection with the drum.

3. In a device according to claim 1, wherein said housing comprises a tape-exit slot for discharging the information expired portion of the tape, and a tear-off edge on the slot permitting tearing off of the discarded tape portion.

4. In a device according to claim 1 and said tape being rolled into a cylinder, a deformable shaft supporting the cylinder and means tightly mounting the shaft to the housing whereby as the tape is fed off the cylinder said shaft is deformed thereby resisting rotation of the cylinder and holding the length of tape between the cylinder and the drum taut.

References Cited by the Examiner
UNITED STATES PATENTS

| | | | |
|---|---|---|---|
| 1,863,789 | 6/1932 | Hall | 40—28 |
| 1,962,039 | 6/1934 | Shmigell | 40—95 |
| 1,986,326 | 1/1935 | Davidson et al. | 40—28 X |
| 2,033,926 | 3/1936 | Decker | 40—95 |
| 2,109,535 | 3/1938 | Jones | 40—28 X |
| 2,113,560 | 4/1938 | Davis | 40—30 |
| 2,290,822 | 7/1942 | Basso | 40—28 X |
| 2,431,784 | 12/1947 | White | 58—149 |

EUGENE R. CAPOZIO, *Primary Examiner.*

JEROME SCHNALL, *Examiner.*